(12) United States Patent
Meehan et al.

(10) Patent No.: US 7,539,642 B2
(45) Date of Patent: May 26, 2009

(54) SYSTEMS AND METHODS FOR CORPORATE SHARE BUYBACK

(75) Inventors: Terence S. Meehan, New York, NY (US); Michael C. Wallach, Woodmere, NY (US); John F. Clayburg, Coon Rapids, IA (US)

(73) Assignee: T.S. Meehan & Associates, LLC, New York, NY (US)

( * ) Notice: Subject to any disclaimer, the term of this patent is extended or adjusted under 35 U.S.C. 154(b) by 976 days.

(21) Appl. No.: 10/976,084

(22) Filed: Oct. 27, 2004

(65) Prior Publication Data

US 2005/0149427 A1 Jul. 7, 2005

Related U.S. Application Data

(60) Provisional application No. 60/514,700, filed on Oct. 27, 2003.

(51) Int. Cl.
*G06Q 40/00* (2006.01)
(52) U.S. Cl. ...................................... 705/37
(58) Field of Classification Search ............... 705/37
See application file for complete search history.

(56) References Cited

U.S. PATENT DOCUMENTS

2004/0034591 A1* 2/2004 Waelbroeck et al. .......... 705/37

OTHER PUBLICATIONS

"Division of Market Regulation: Answers to Frequently Asked Questions Concerning Rule 10b-18 ("Safe Harbor" for Issuer Repurchases)" http://www.sec.gov/divisions/marketreg/r10b18faq0504.htm.*

* cited by examiner

*Primary Examiner*—James A Kramer
*Assistant Examiner*—James A Vezeris
(74) *Attorney, Agent, or Firm*—Sutherland Asbill & Brennan LLP (57) ABSTRACT

Systems, methods and computer program products enable companies to consistently repurchase corporate stock at a price below the industry-standard Volume Weighted Average Pricing (VWAP). Historical trade data is analyzed to identify prior prime purchasing opportunities that are used in determining a baseline. During each trading period, as a favorable purchasing opportunity arises, the amount of corporate stock to be purchased is adjusted based upon the strength of the current pricing when compared to the baseline. That is, when the current pricing is identified as being highly favorable, more shares of corporate stock are purchased. Accordingly, this dynamic purchasing scheme allows companies to consistently repurchase corporate stock at favorable prices.

10 Claims, 6 Drawing Sheets

SYSTEMS AND METHODS FOR CORPORATE SHARE BUYBACK

RELATED APPLICATIONS

The present application claims benefit of U.S. Provisional Application Ser. No. 60/514,700, filed Oct. 27, 2003, which is incorporated herein in its entirety by reference.

BACKGROUND OF THE INVENTION

I. Field of the Invention

The present invention relates generally to systems, methods, and computer program products for purchasing corporate stock at a price below the industry-standard Volume Weighted Average Price (VWAP).

II. Description of Related Art

Publicly held companies often engage in common stock repurchasing programs, also known as buyback programs. Repurchasing programs provide an important function of minimizing uncertainty, and therefore, are vital to public companies and the securities markets generally. There are numerous benefits to such programs, such as minimizing dilution to public stockholders as a result of equity-based employee benefit plans, providing a more tax-advantageous way under tax law to return capital to stockholders than paying a dividend, and providing liquidity in extreme market declines. In conducting repurchasing programs, many companies seek to comply with Rule 10b-18 of the Securities Exchange Act of 1934, which establishes a non-exclusive safe harbor to avoid claims of market manipulation based on the manner, timing, price, and volume of their purchases. While not necessarily material for purposes of the present disclosure, Rule 10b-18 strictly defines the mechanics of how repurchasing programs are conducted with regard to manner, time, price, and volume of the purchases.

When conducting a repurchasing program, it is recognized that there are clear advantages of buying a stock at or below the Volume Weighted Average Price (VWAP). VWAP is a well-known trade evaluation benchmark. VWAP can be calculated, for example, by adding up the dollars traded for every transaction (price times shares traded) for a particular stock within the desired time period (e.g., a day), and then dividing by the total shares traded for that time period (e.g., a day). It is believed by many that if a stock is purchased at a price that is equal to the VWAP over a significant period of time, then the buy is considered to be successful. It has been determined by the present applicants that many institutions are comfortable with their repurchasing efforts if their buys match the VWAP price for the stocks of interest over a specified time period.

Thus, there exists an unsatisfied need in the industry for a means to consistently purchase corporate stock at a price below the industry-standard VWAP.

SUMMARY OF THE INVENTION

The present invention provides a computer implemented invention for consistently purchasing corporate stock at a price below the industry-standard VWAP. In a preferred embodiment, the present invention comprises a computer program that first analyzes a finite set of historical data prior to each trading day. It then identifies specific pricing opportunities from this set of data that returned prices with the greatest advantage over the calculated VWAP for the same period. In addition to the identification of the prime pricing opportunities, the program also records, evaluates, and sorts secondary buying opportunities that occurred in the tested historical data.

During the actual trading day the program evaluates each trading period, for example, 15 minutes. The program then references current pricing with respect to historical data, comparing each to previously advantageous opportunities. When a situation is presented that favorably compares to any of the prime historical patterns identified from the tested historical data, a buy signal is generated. Each buying opportunity is compared on its own merits with reference to the historical buying patterns previously identified. This process results in a varying number of shares that are to be purchased at the identified price. When the program, in comparison to past data, identifies a more favorable buying opportunity, a greater number of shares will be purchased.

Using this process, the program, over a defined period of time, consistently results in the purchase of a specified number of shares that is significantly less than the calculated VWAP.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As will be appreciated by one of ordinary skill in the art, upon reading the following disclosure, the present invention may be embodied as a method, a data processing system, or a computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the storage medium. Any suitable computer readable storage medium may be utilized including hard disks, CD-ROMs, optical storage devices, or magnetic storage devices.

The present invention is described below with reference to flowchart illustrations of methods, apparatus (i.e., systems) and computer program products according to an embodiment of the invention. It will be understood that each block of the flowchart illustrations, and combinations of blocks in the flowchart illustrations can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

For purposes of the disclosed embodiment, the trading day is divided into 15 minute intervals, and purchases will be considered on that basis. However, it will be appreciated by those skilled in the art that trade periods of other lengths may be utilized in accordance with the present invention. Furthermore, the illustrative embodiment is not to be construed as promoting a certain safe harbor practice under Rule 10b-18, but is provided to illustrate the concepts comprising the present invention, which can be implemented in numerous other forms to achieve the same results described herein in a manner consistent with Rule 10b-18.

Figure 1:
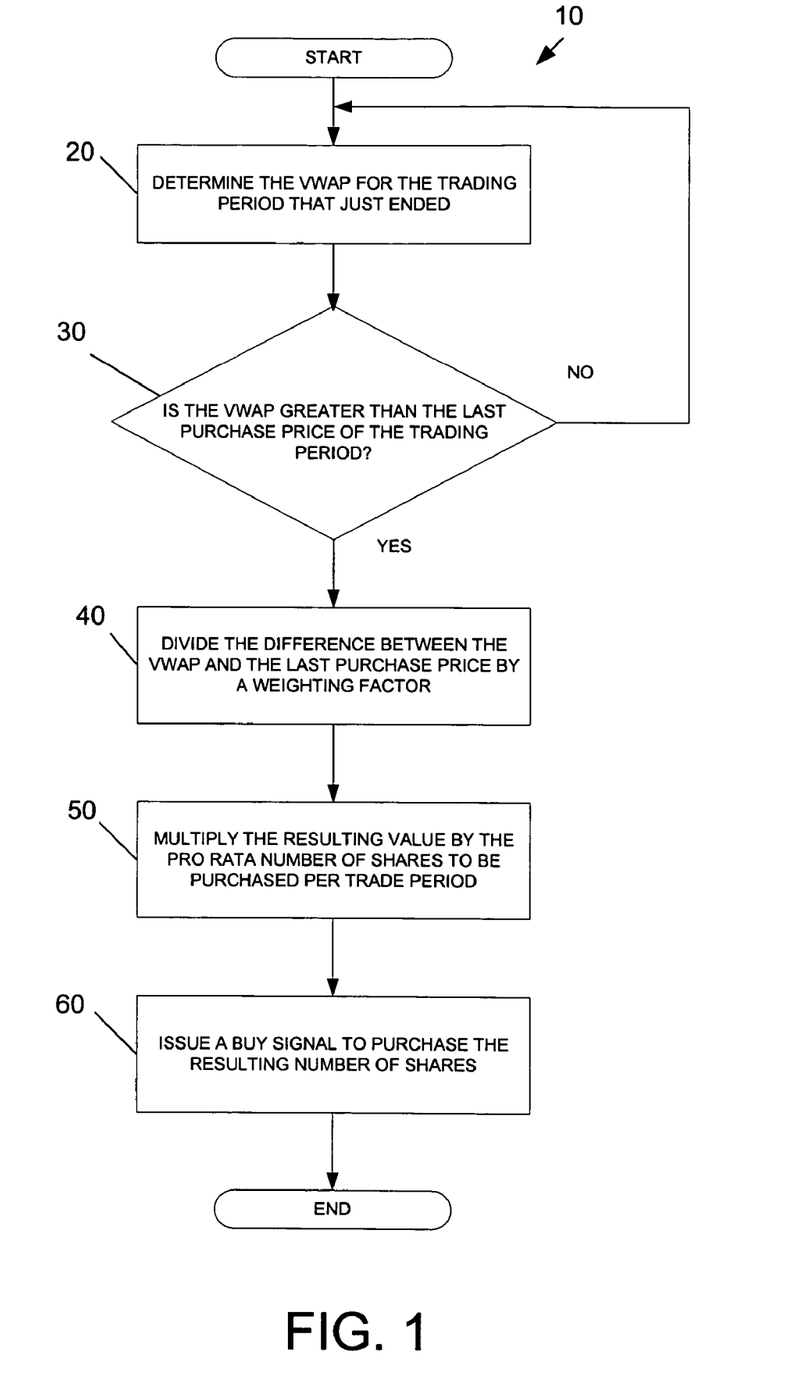
FIG. 1 is a flow diagram of an illustrative embodiment of the present invention.

With general reference to FIG. 1, shown are the steps of an illustrative embodiment of the present invention. The process flow 10 according to the present invention begins by determining the VWAP of the current trading period (a 15 minute period in the illustrated embodiment), as indicated by block 20. At block 30, it is determined if the VWAP is greater or less than the last closing price of the same trading period. If it is equal to or less than the last closing price, then no buy signal is generated and the program waits to execute on the next trade period. If it is greater than the last closing price, then the difference between the VWAP and last closing price is divided by a weighting factor based on historical trade data, as indicated by block 40. An aspect of the present invention is the determination of the weighting factor based on historical trade data, as described in detail below. The weighting factor is a baseline to determine the strength of the buy opportunity so that more shares are purchased during highly advantageous periods and fewer are purchased at less advantageous periods. The result is an improved net average price attained.

The result from block 40 is then multiplied by the pro rata number of shares to be purchased in that trading period based on the total number of shares to be purchased in the buyback program, as indicated by block 50. A buy signal is then generated for this number of shares, as indicated by block 60. Preferably, the buy signal is processed in an automated fashion by an electronic trading system. This process, in accordance with the present invention, will now be described in greater detail.

In the preferred embodiment, the present invention is a software application written in TradeStation EasyLanguage® and implemented on a TradeStation platform (e.g., TradeStation 8) available from TradeStation Technologies, Inc. (see www.tradestation.com). Accordingly, the present invention utilizes the functionality of the TradeStation platform to provide the data collection, calculations, and order generation of the present invention, as described herein. Therefore, the hardware requirements of the preferred embodiment of the present invention are essentially those of a TradeStation installation.

Initially, the program receives certain data, such as the number of shares which are to be purchased back and the time frame during which the purchases are to be completed, for example, 30 days, 60 days, etc. The number of shares to be purchased is divided by the number of trading days in the specified trading period. The number of shares calculated above is then divided by the number of 15 minute periods during the trading day when exchange rules (e.g., Rule 10b-18) permit share repurchase plans to be executed. That is, do not include trade periods when the exchange rules do not allow buyback trades (e.g., currently the opening transaction and the closing 10 minutes of the trade day). Historical market prices and volume of trading are obtained from TradeStation Network servers using, for example, an Internet connection. The TradeStation Network is a data service owned and maintained by TradeStation Group, Inc., 8050 Southwest $10^{th}$ Street, Suite 4000, Plantation, Fla.

The retrieved data is then used to create and maintain a locally stored database of each company for which a buyback program is being implemented. This database is created and used by the TradeStation, the charting, programming, trading platform provided by The TradeStation Group. All of the calculations and actual trade generation that follows are preferably done on this platform.

From this database a historical database is created for each 15 minute time interval for a predefined period of time, such as the last 30 days. An intraday VWAP is calculated by the program for each 15 minute time interval in the database.

The next step in the process of calculating (in essentially real-time) the number of shares to be purchased and the time at which they are to be purchased is the creation of a baseline (also known as the weighting factor) that is representative of the behavior of the stock in question over the preceding 30 day time period. This baseline can be calculated as follows:

For each 15 minute trading period for the last 30 days, subtract the value of the last price of each 15 minute trading period from the volume weighted average price (VWAP) of the same 15 minute trading period. This represents the gap between the VWAP and the final price of the 15-minute trading period (VWAP-gap).

Considering all the VWAP-gap values for each 15 minute trading period for the last 30 days, isolate the five largest values of the VWAP-gap.

Calculate the average of these five VWAP-gap values. This becomes the baseline that updates itself constantly as new data is received by the computer.

It will be appreciated by those skilled in the art that alternative means of determining a baseline may be utilized in accordance with the present invention, such as using the average price of a trading period compared to the final price of the same trading period, similar to the calculations used to determine the VWAP-gap for each 15 minute period. In this instance, trade volume is not used in the calculation of the baseline. Additionally, the 30 day historical period for calculating the baseline could be varied between 20 and 60 days or more without significantly altering strategy effectiveness.

The same could also be said for the average of the 5 largest VWAP-gap values used to calculate the baseline. Actually, one could use a two VWAP-gap average up to a 20-30 VWAP-gap average without significantly altering strategy effectiveness.

Having calculated a baseline, for each new 15 minute period, subtract the last price of this period from the VWAP for the identical time period. This is the current VWAP-gap. If this resulting VWAP-gap is negative, then a no buy decision is made and the program repeats the steps outlined above on the next 15 minute period. However, if the resulting current VWAP-gap is positive, then the program divides this current VWAP-gap by the VWAP-gap average calculated above (i.e., the baseline). The resulting ratio is indicative of the strength of the current buying opportunity and is also known as the purchase strength factor. This ratio (i.e., purchase strength factor) is then multiplied by the number of shares to be purchased per 15 minute period, as calculated above by dividing the total number of shares to be purchased by the number of trading days and then by the number of 15 minute periods during each trading day. The resulting value is the number of shares to be purchased at this time.

Next, for each stock with an active buyback program, a buy order ticket is generated in the form of a text file. The text file contains the time and date of the purchase and the number of shares to purchase. This file is written to a specific location on the hard drive on the server (i.e., computer) on which both TradeStation and the order placement software is running. The order is then retrieved by an intelligent front-end order placement program and sent to the appropriate exchange for filling.

Experimental Data

Recognizing that different companies may wish to execute buybacks over varying time periods, the effectiveness of the program was tested and measured over weekly, monthly, and quarterly time frames. Initial testing was performed over five years of historical data (1997-2002). The first tests were compiled using successive 5, 20 and 60 day testing periods, that coincides with weekly, monthly and quarterly time frames, using a 15 minute time period during the day. It was assumed that the base VWAP system would buy 100 shares on each bar available for stock buybacks. According to exchange rules in effect at the time, buybacks were not permitted during the opening or the last 30 minutes of the session. Therefore the program prohibited trading on the first 2 time periods or last 2 time periods of the day.

Results reported for each trading day in each period were compiled for the VWAP price for each day, the average price at which the program had purchased stock, the number of shares purchased by both the base (VWAP) pricing structure and the program. Calculations were also performed that displayed the advantage of the program over VWAP pricing. To enable automated reporting and analysis of testing data, subroutines were incorporated into the base program that exported system results to MS Excel for statistical and graphic analysis.

The following table summarizes the testing results of which are detailed below. The first column, Pct Wins, lists the percentage of testing periods in each category that returned purchase prices that were superior to the base VWAP pricing. For example, the Dow 30, 5 day category represents testing of 238 trading periods for each stock, or 7140 periods for the entire group. Of these, there were 6125 periods, or 85.78% during which the program produced purchase prices that were lower than the VWAP benchmark. In terms of price per share, the Average VWAP Advantage over the entire time period was $0.3127 per share.

| Category | Pct Wins | Average VWAP Advantage |
|---|---|---|
| Dow 30 5 Day | 85.78 | $0.3127 |
| Dow 30 20 Day | 81.78 | $0.3176 |
| Dow 30 60 Day | 77.84 | $0.2706 |
| Nasdaq 100 5 Day | 82.54 | $0.3737 |
| Nasdaq 100 20 Day | 78.20 | $0.3393 |
| Nasdaq 100 60 Day | 69.65 | $0.2404 |

The test data graphs discussed below of the performance of the program on the Dow 30 were generated using 15 minute buying intervals over consecutive 60 day trading periods, which approximates three months of trading. By using a 60 day time frame, it was almost certain that at least one earnings period is included in each test.

Figure 2:
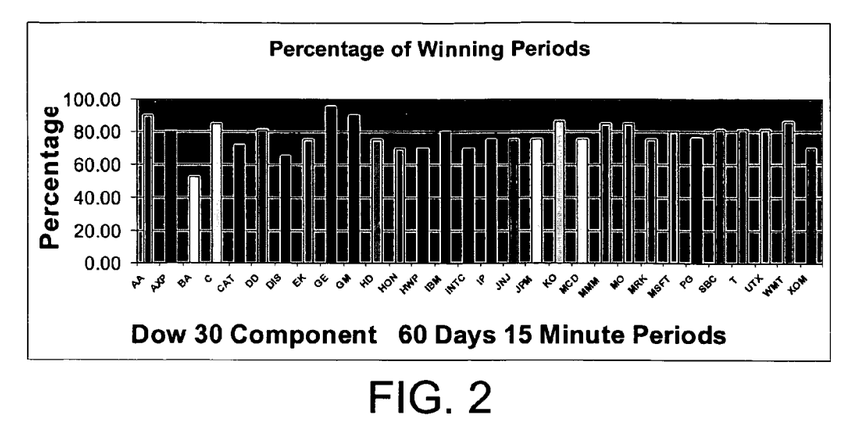
FIGS. 2-10 are graphical representations of test data generated in accordance with an embodiment of the present invention.

FIG. 2 details the percentage of 60 day periods during which the program returned results that were superior to the traditional VWAP benchmark. Results are tabulated separately for each of the current DOW 30 components. The program produced a 77.84 overall winning percentage across all 30 issues.

Figure 3:
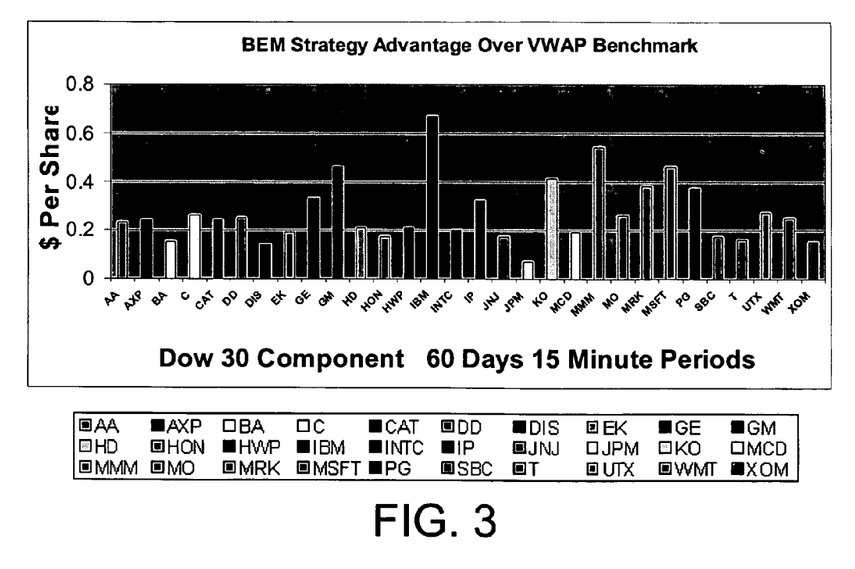

FIG. 3 represents the actual buying advantage, on a per-share basis, of the strategy of the present invention over the traditional VWAP benchmark. The average advantage per share, across all DOW 30 components over the 5 year testing periods, was $0.27 per share purchased.

To further test the consistency of the strategy, and to simulate actual possible purchasing scenarios, the strategy was run using 5 and 20 day testing periods. The 5 day period was selected to simulate a weekly buying program; the 20 day period was selected to simulate a monthly schedule.

Figure 4:
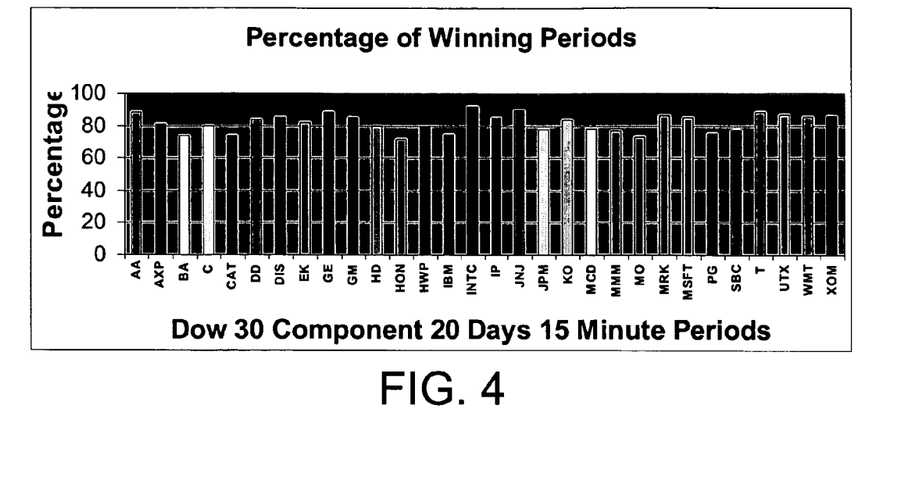

FIG. 4 shows the percentage of winning periods using a series of 20 day testing periods over the 5 years of data used. There were 60 consecutive periods in the test. Using this scenario, an average of 81.78% of the periods returned a pricing advantage over the VWAP benchmark.

Figure 5:
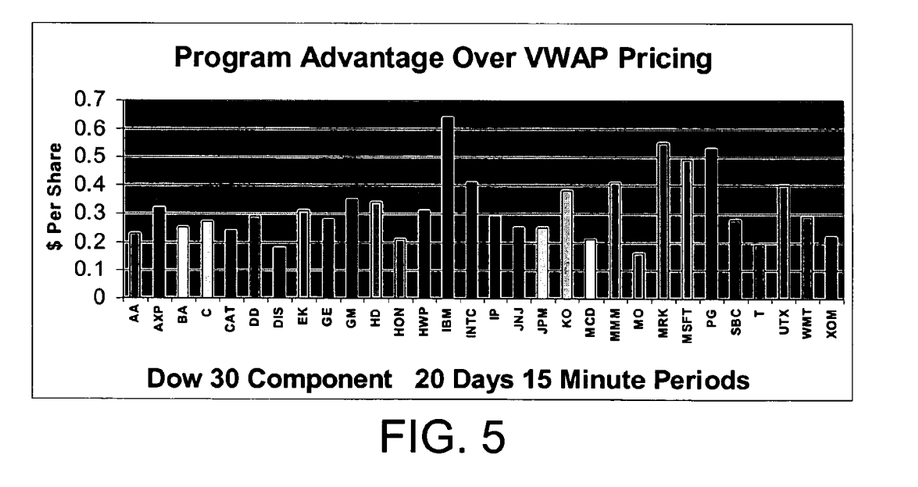

The average price advantage of the strategy of the present invention over the VWAP benchmark remained consistent when the 20 day periods were used, as illustrated in FIG. 5.

Figure 6:
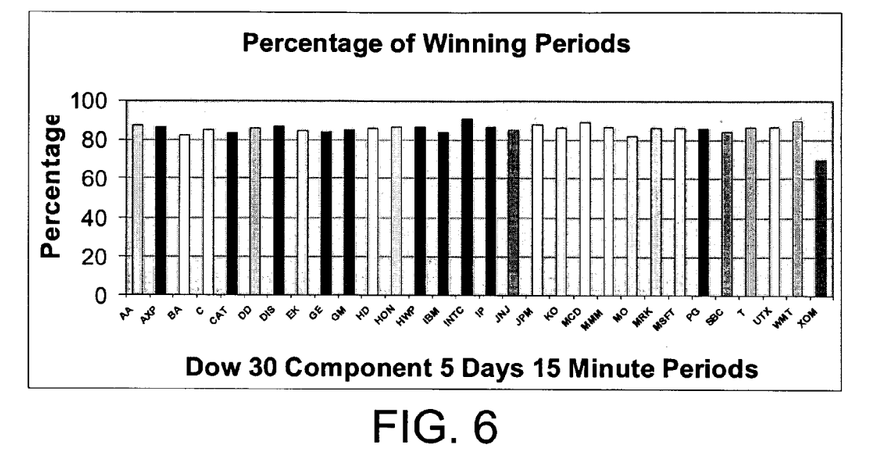
Figure 7:
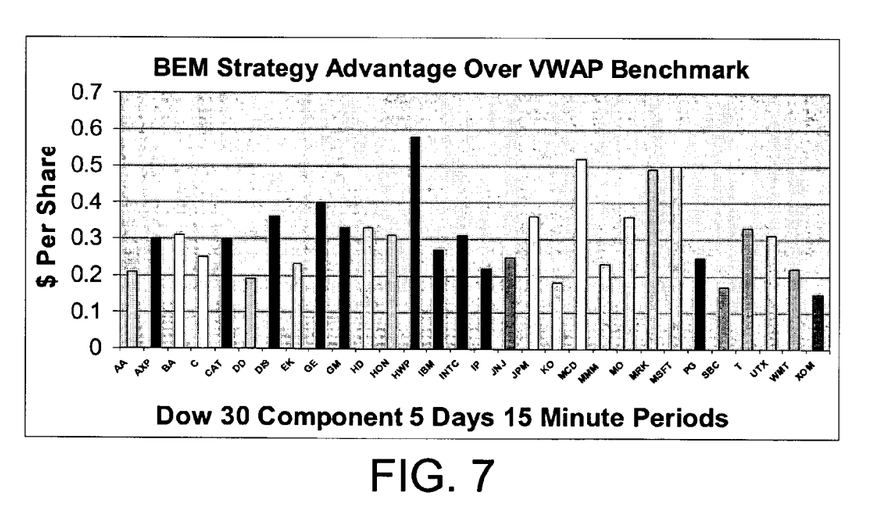

FIGS. 6 and 7, used in this instance to demonstrate the use of the program on a weekly purchasing scenario, continue to demonstrate the consistency of the strategy over disparate time periods. The percentage of winning periods remained an impressive 85.78% while the average advantage per share remained consistent with other tests.

Accordingly, the present invention accurately identifies prime buying opportunities for the stock issue in question. Buying the same amount of stock at each identified buying point has been shown to result in a better average price than is obtained by simply buying the stock at the VWAP. However, as mentioned above, some points, in retrospect, would have been prices at which buying an increased number of shares would have dramatically improved the net average price attained by the strategy. Realizing this fact, the present invention is designed to identify these prime points over past data. The characteristics of these prices are then stored in memory (e.g., the baseline or weighting factor as discussed above). Subsequently, each identified buying opportunity is compared to the baseline. Following this comparison each identified buying point is assigned a purchase strength factor. The number of shares to buy at each buying point is then determined by combining the purchase strength factor with the predetermined number of shares to be purchased at each buying point. In this fashion, each buying opportunity identified by the strategy is used to its utmost advantage.

The net result of these variable inputs and dynamic features is that a relatively large number of shares may be purchased on some days while a comparatively small amount may be purchased on others. In fact, it is likely that there will be several days during a specified buying strategy during which absolutely no buying activity will occur during the entire day. On rare instances, it is also possible that several successive days will pass without a single share being purchased by the strategy. Such days are frequently preceded by or followed by days during which a significantly higher level of buying has or will occur. Over a given period of time, the extremely low and extremely high buying levels on each day will average out, resulting in a purchase level that compares favorably with the amount purchased had one simply bought the stock at the VWAP for each buying opportunity. The notable difference is that, using historical data, due to the dynamic nature of the buying levels generated by the strategy, a lower average buy price will result.

Figure 8:
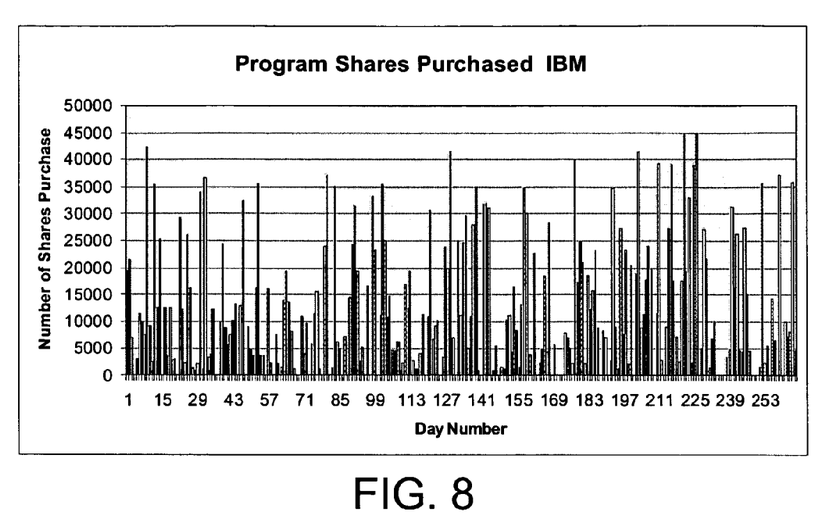

Another example, illustrated in FIG. 8, was constructed from data generated by the logic of the present invention on IBM historical data. The selected period begins on Feb. 17, 2001 and ends Apr. 9, 2002, covering 267 trading days. The graph of FIG. 8 illustrates the varying number of shares purchased on each trading day as a result of the identification of prime buying opportunities identified by the present invention. Note the significant variability of the amount of shares that were purchased on any given day.

Over the designated period of time represented by the graph, the present invention purchased 3,583,884 shares of IBM stock using the variable buying routine described above. During the same period the base VWAP benchmark, buying 1000 shares per bar on a 15 minute buying interval, purchased 3,562,000 shares. The average purchase price of IBM stock as performed by the base VWAP benchmark was $107.79 per share compared to $106.26 per share that was paid by the present invention. This represents a savings of $1.53 per share when using the present invention. The total dollar savings in this example, using the 3,583,884 shares purchased by the strategy, is $5,483,342.52.

The market impact, or the possibility of the purchase of a large block of company stock actually influencing the price of the stock on a short term basis, is muted by the fact that the buys are distributed throughout the day as opposed to buying a large volume at a single time.

Figure 9:
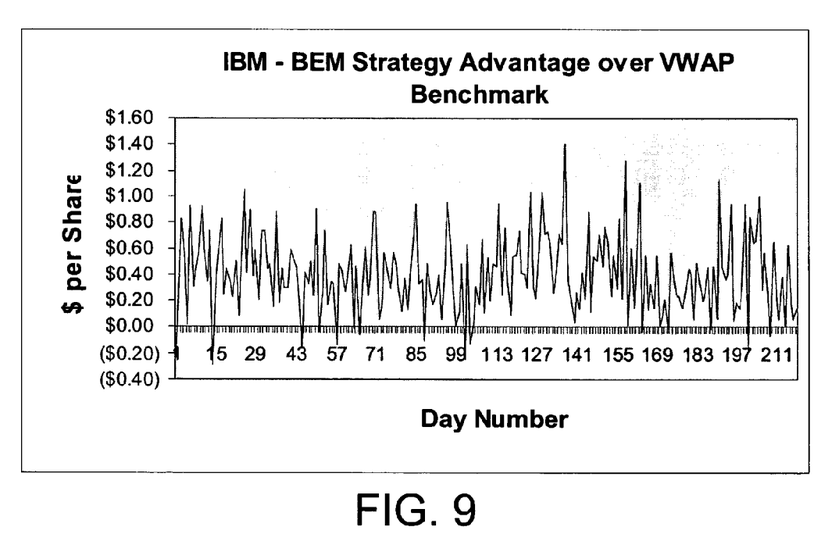

FIG. 9 details the daily price per share advantage of the present invention over the standard VWAP benchmark. Note that only 219 days are reported on the graph of FIG. 8 versus 267 shown on the above in FIG. 9. For simplicity, the days on which no stock was purchased are not represented on this chart.

Figure 10:
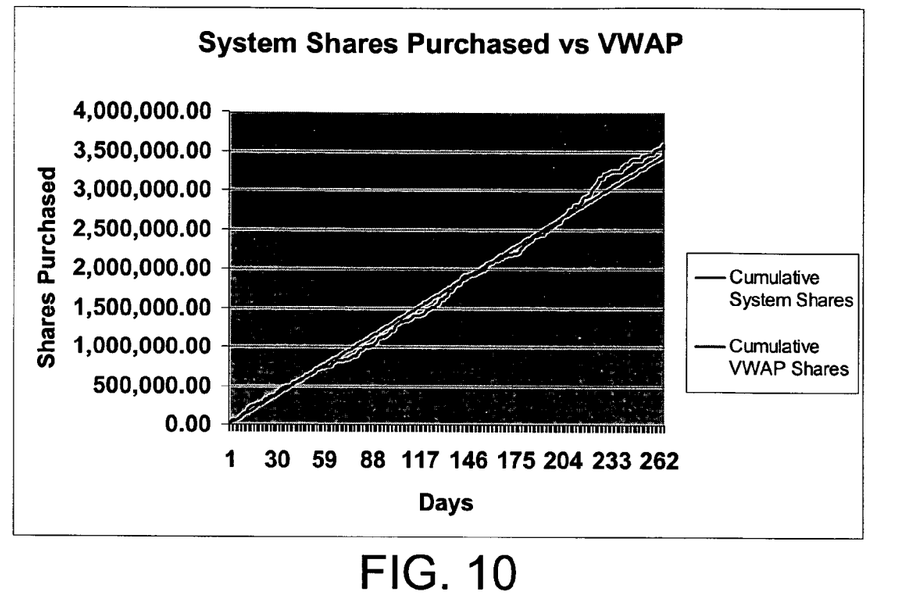

FIG. 10 is presented to illustrate the variable buying as executed by the present invention. Note that the strategy of the present invention rarely, if ever, buys the base amount of shares on any given day. On some days it buys nothing whatsoever. However, over a period of time the number of shares priced by the strategy closely approximates the total bought by the base VWAP benchmark.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method for repurchasing a corporate stock at a price below a Volume Weighted Average Price (VWAP), comprising executing computer program instructions by one or more processors for:
   determining a VWAP for a trading period;
   determining that the VWAP of the trading period is greater than a last closing price of the trading period;
   dividing a mathematical difference between the VWAP and the last closing price by a weighting factor to derive a purchase strength factor, wherein the weighting factor is determined by calculating a plurality of gap values based upon a mathematical difference between an average stock price and a closing price for each of a plurality of prior time periods within a historical trading window of time, identifying a predetermined number of largest gap values from the plurality of gap values, and then averaging the predetermined number of largest gap values to determine the weighting factor;
   multiplying the purchase strength factor and a predetermined number of shares to derive a buyback number of shares; and
   generating a request to purchase the buyback number of shares of the corporate stock.

2. The method of claim 1, wherein the historical trading window of time is greater than one day.

3. The method of claim 1, wherein multiplying the purchase strength factor and a predetermined number of shares comprises multiplying the purchase strength factor value by a pro rata number of shares to be purchased per trading period.

4. The method of claim 1, wherein the predetermined number of shares is determined by dividing a total number of shares to be repurchased by a number of trading periods during which the shares can be purchased.

5. The method of claim 4, wherein the trading period is less than one day.

6. A system for repurchasing a corporate stock at a price below a Volume Weighted Average Price (VWAP), the system comprising:
   a database of historical trading data relating to the corporate stock; and
   a micro-controller configured for executing computer-executable instructions for performing a repurchase program for the corporate stock, and wherein the micro-controller receives a feed of real-time trade data for a plurality of trading periods relating to the corporate stock and has access to the database, the computer-executable instructions performing the steps of:
      determining a VWAP for a trading period;
      determining that the VWAP of the trading period is greater than a last closing price of the trading period;
      dividing a mathematical difference between the VWAP and the last closing price by a weighting factor to derive a purchase strength factor, wherein the weighting factor is determined by calculating a plurality of gap values based upon a mathematical difference between an average stock price and a closing price for each of a plurality of prior time periods within a historical trading window of time, identifying a predetermined number of largest gap values from the plurality of gap values, and then averaging the predetermined number of largest gap values to determine the weighting factor;

multiplying the purchase strength factor and a predetermined number of shares to be purchased per trading period to derive a buyback number of shares; and generating a request to purchase the buyback number of shares of the corporate stock.

7. The system of claim 6, wherein the at least a portion of the database of historical trading data comprises historical trading data greater than one day.

8. The system of claim 6, wherein multiplying the purchase strength factor and a predetermined number of shares comprises multiplying the purchase strength factor by the predetermined number of shares.

9. The system of claim 6, wherein the predetermined number of shares is determined by dividing a total number of shares to be repurchased by a number of trading periods during which the shares can be purchased.

10. The system of claim 9, wherein the trading periods are less than one trading day.

\* \* \* \* \*